United States Patent Office 3,299,086
Patented Jan. 17, 1967

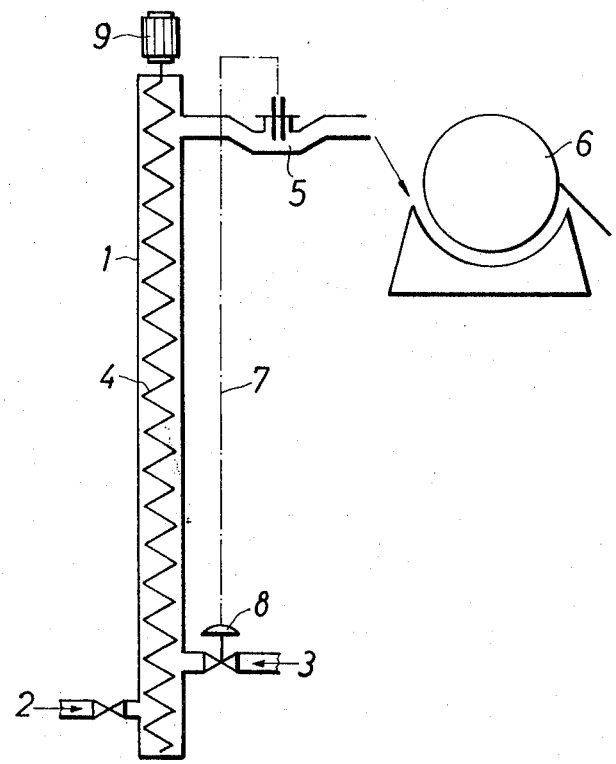

3,299,086
PROCESS FOR THE PREPARATION OF MERCAPTOBENZTHIAZOLE
Gottfried Gollmer, Cologne-Stammheim, and Hermann Wolz, Leverkusen, Germany, assignors to Farbenfabriken Bayer Aktiengesellschaft, Leverkusen, Germany, a German corporation
Filed Oct. 25, 1963, Ser. No. 318,928
Claims priority, application Germany, Nov. 29, 1962, F 38,419
4 Claims. (Cl. 260—306)

The present invention relates to and has among its objects a process for the continuous production of mercaptobenzthiazole and a device for carrying out this continuous process.

In the technical production of mercaptobenzthiazole, an aqueous solution of alkaline earth or alkali salts of mercapto benzthiazole is formed primarily. Mercaptobenzthiazole is obtained from these solutions by reaction with acids. On a technical scale, the reaction is carried out by running enough acid for complete reaction into the mercaptobenzthiazole salt solutions which are heated to at least 40° C. The mercaptobenzthiazole thus obtained is found after filtration to have a solids content of 60 to 70%.

The disadvantages of this process are: it must be carried out discontinuously; the reaction requires a temperature of over 40° C.; and the end product cannot be readily dried in spite of its relatively high solids content, (e.g., when compared with dibenzthiazolyl disulphide).

Carrying out the process discontinuously makes it difficult to render it automatic since it is necessary to control four processes, namely (1) filling the tank, (2) heating to 40° C., (3) running in the acid and (4) emptying the tank.

If, on the other hand, the precipitation of mercaptobenzthiazole is carried out continuously in known manner at temperatures up to 70° C. a product is obtained which is difficult to filter and which still contains about 60% to 80% of water after filtration. This product is more difficult to dry than that produced by the discontinuous method. If the reaction is carried out at room temperature, a sludge which is practically impossible to filter is obtained in both the continuous and discontinuous processes, which sludge has correspondingly poor drying properties.

In accordance with the present invention, a process for the continuous production of mercaptobenzthiazoles has now been found in which the reaction is carried out in a flow tube, the reaction solution flowing through the tube at a velocity of 0.1 to 10 m./sec., and the precipitated mercaptobenzthiazole being separated at the outlet end of the tube. Temperatures of 0 to 100° C. are employed, preferably 15 to 20° C., and a product is obtained which corresponds in its solids content to the product obtained by the discontinuous method at 40° C., and is far superior to it in its drying properties.

The mercaptobenzthiazole salt solution to be reacted, flows at a velocity of 0.1–10 m. per second, preferably 0.1–4 m. per second, and is continuously mixed with the calculated quantity of acid, an equivalent ratio of at least 1:1 being required. This ensures that the reaction mixture entering first does not mix with that entering later, as precipitation still continues for 5–10 seconds after the components have been mixed.

The diameter of the flow tube is such that at a given rate of throughput the flow velocity cannot fall below a certain value, and the length of the tube allows the contents to remain there for about 5 to 10 seconds. The tube is equipped with a stirrer to prevent the formation of deposits and stoppages. The minimum flow velocity depends on the diameter of the tube, and for example at 8 mm. it should be 0.1 m./sec. and in a diameter of 25 mm., 0.2 m./sec. The drawing shows diagrammatically the apparatus for carrying out the process. The flow tube 1 has an inlet 2 at one end for the mercaptobenzthiazole salt solution, and about 200 mm. further downstream in the direction of flow is the inlet 3 for the acid.

The conveyor-stirrer 4 which may, for example be in the form of a spiral or a cam shaft, extends along the whole length of the tube and is driven by its motor 9. The reaction mixture flows out at the other end and past the pH chain 5 to the rotary filter 6. The membrane valve 8 which determines the quantity of the acid flowing into the tube is adjusted by the pH cell 5 over the control path 7.

The two components are run into the tube simultaneously, and a suspension of mercaptobenzthiazole is obtained at the outlet. The mercaptobenzthiazole is obtained from this suspension by filtration and then worked up in the usual manner. The rate at which one of the components, e.g., the mercaptobenzthiazole salt solution, is run in, is accurately adjusted. The rate of addition of the other component, i.e., the quantity of hydrochloric acid run in per hour, is then automatically regulated by the pH of the reaction mixture.

The pH may be maintained constant within a pH range of 1 to 8, being preferably adjusted to 7.

The product so obtained has a solids content of 60% to 70%, and under certain drying conditions it may dry within 7 hours, whereas the product produced at 40° C. by the discontinuous method and having the same solids content requires over 10 hours for drying under the same conditions.

For example, 140 g. of the product obtained by the process according to the invention will dry under the same conditions and in the same time as 100 g. of the product obtained by the discontinuous method at 40° C. Mercaptobenzthiazole prepared continuously by known process has a much poorer drying property even than the discontinuously produced product.

As it is obtained at room temperature, the waste water formed in the process according to the invention only contains about 0.03% mercaptobenzthiazole, whereas in known processes waste water containing about 0.06% to 0.12% mercaptobenzthiazole is produced. When the starting solution has a mercaptobenzthiazole content of about 5%, this corresponds to an improvement of yield of about 1.2% to 2%.

The process according to the invention for the preparation of mercaptobenzthiazole, which is known as a vulcanisation accelerator, has the following advantages compared with known processes.

(1) Lower consumption of energy, (2) shorter drying times, (3) a more rational working procedure, (4) better yields, (5) purer waste water.

*Example 1*

900 litres per hour of an aqueous mercaptobenzthiazole salt solution containing 5% mercaptobenzthiazole are passed through a tube having an internal diameter of 25 mm. and a length of 5 metres. At the same time, about 29 litres/hour of 30% hydrochloric acid are run continuously into the tube, the inflow being controlled by adjusting the pH of the reaction mixture to 7.

The tube is provided with a stirrer. A suspension of mercaptobenzthiazole leaves the end of the tube, the mercaptobenzthiazole is filtered from this solution and worked up in the usual manner. Yield: 44.7 kg. mercaptobenzthiazole per hour.

*Example 2*

6500 litres per hour of a mercaptobenzthiazole salt solution containing 4.3% mercaptobenzthiazole are passed through a tube equipped with stirrer and having an internal cross-section of 20 cm.² and a length of 5.5 m. At the same time, about 210 litres of 30% hydrochloric acid flow continuously into the tube, the pH being maintained at about 7.

275 kg. of mercaptobenzthiazole (100 p.c.) are obtained and worked up in the usual manner. The product contains about 25% of water after filtration and is dried at the rate of 275 kg. mercaptobenzthiazole (100 p.c.) per hour in a continuously-operating drier.

Under the same conditions, the same drier can only dry 130 kg./h. of the product produced by the discontinuous method above 40° C.

We claim:
1. Process for the continuous production of mercaptobenzthiazole which comprises running an aqueous solution of a mercaptobenzthiazole salt selected from the group consisting of alkaline and alkaline earth salts and containing 1 to 20% of mercaptobenzthiazole through a flow tube at a velocity of 0.1 to 10 m./sec. and at a temperature of 0 to 100° C., mixing said aqueous solution with an aqueous solution of an inorganic acid in an equivalent ratio of at least 1:1 while flowing through the flow tube and filtering the precipitated mercaptobenzthiazole from the obtained suspension.

2. Process according to claim 1, wherein the molar ratio of the aqueous solution of such mercaptobenzthiazole salt and the aqueous solution of the inorganic acid is controlled by automatically maintaining a constant pH value between 1 and 8.

3. Process for the continuous production of mercaptobenzothiazole which comprises introducing an aqueous solution of an inorganic acid into a linear flow of a 1 to 20% aqueous solution of a mercaptobenzothiazole salt selected from the group consisting of alkaline and alkaline earth salts, which is conducted along a linear confined flow path at a flow velocity of 0.1 to 10 m./sec. at a temperature of about 0 to 100° C., in an equivalent ratio of at least 1:1 of acid to mercaptobenzothiazole salt, admixing said acid with said mercaptobenzothiazole salt during flow long said path, whereby to precipitate mercaptobenzothiazole from the resultant aqueous reaction mixture, and filtering the precipitated mercaptobenzothiazole from such reaction mixture to recover the same.

4. Process according to claim 3 wherein the ratio of said acid to said mercaptobenzothiazole salt is adjusted to maintain a constant pH between 1 and 8 in the reaction mixture, the flow cross-section and length of said flow path being such that at said flow velocity a contact time between the acid and mercaptobenzothiazole salt of about 5 to 10 seconds is achieved.

References Cited by the Examiner
UNITED STATES PATENTS

| | | | |
|---|---|---|---|
| 2,631,153 | 3/1953 | Paul et al. | 260—306 |
| 2,730,528 | 1/1956 | Weyker et al. | 260—306 |
| 2,827,365 | 3/1958 | Mason | 23—259 |
| 2,955,025 | 10/1960 | Conlon | 23—259 |

ALEX MAZEL, *Primary Examiner.*

A. D. ROLLINS, *Assistant Examiner.*